United States Patent [19]

Luxford et al.

[11] 4,378,119
[45] Mar. 29, 1983

[54] MECHANICAL FACE SEALS WITH SPECIAL BELLOWS

[75] Inventors: Geoffrey Luxford, Slough; Grant A. Masom, Iver, both of England

[73] Assignee: Crane Packing Limited, Slough, England

[21] Appl. No.: 283,827

[22] Filed: Jul. 16, 1981

[30] Foreign Application Priority Data

Jul. 24, 1980 [GB] United Kingdom ................ 8024235

[51] Int. Cl.³ .............................................. F16J 15/36
[52] U.S. Cl. ........................................ 277/88; 277/3; 277/93 SD
[58] Field of Search ............... 277/3, 27, 81 R, 88-90, 277/93 R, 93 SD, 200

[56] References Cited

U.S. PATENT DOCUMENTS 2,010,930  8/1935  Rowe ................................. 277/90 X
3,074,728  1/1963  Freed ..................................... 277/3
3,961,799  6/1976  Peet ............................. 277/81 R X

FOREIGN PATENT DOCUMENTS 518339  2/1940  United Kingdom ................ 277/88

Primary Examiner—Robert S. Ward, Jr.
Attorney, Agent, or Firm—Kemon & Estrabrook

[57] ABSTRACT

A mechanical face seal adapted to withstand a pressure differential across its sealing faces, includes a bellows unit of monolithic construction, comprising a plurality of corrugations, the crowns of the convolutions directed towards the high pressure side of the seal being of greater radius of curvature than the crowns of the convolutions directed towards the low pressure side of the seal.

13 Claims, 1 Drawing Figure

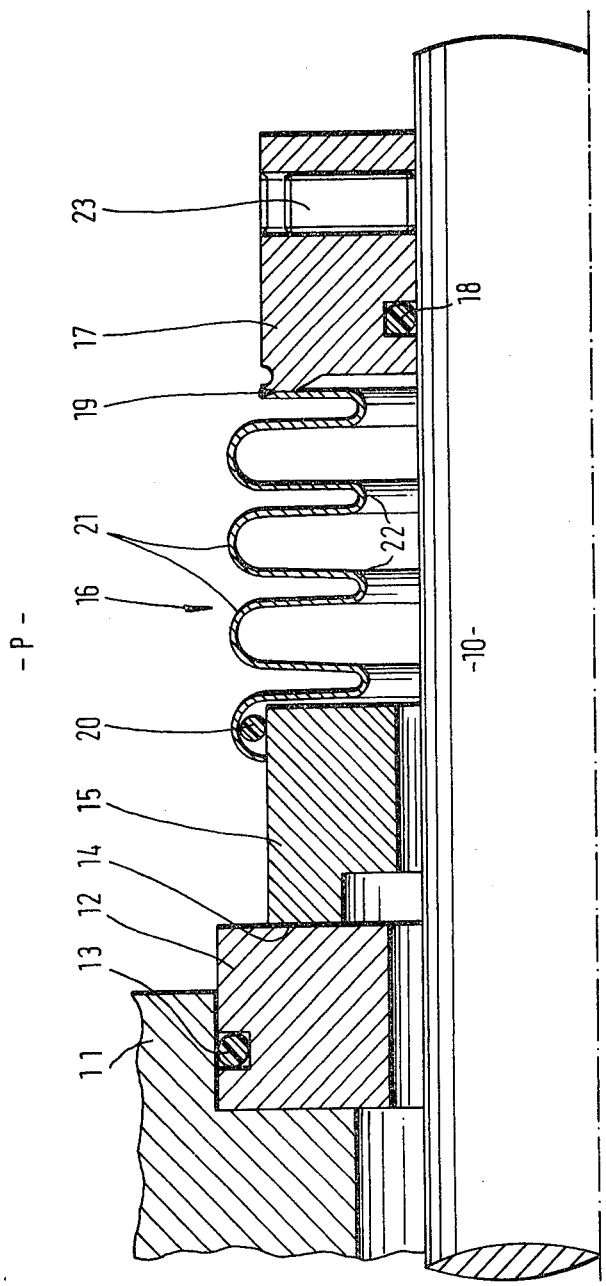

MECHANICAL FACE SEALS WITH SPECIAL BELLOWS

The present invention relates to mechanical face seals and in particular mechanical face seals including a flexible resilient bellows unit.

One form of mechanical face seal for providing a seal between a pair of relatively rotatable machine components comprises a first seal member which is secured in a fluid-tight manner to one of said components and a second seal face member having a sealing face which is urged against an opposed sealing face of the first seal face member, the second seal face member being secured to the other of said components by means of a flexible resilient bellows unit. In this form of seal, the bellows unit serves to provide a seal between the second seal face member and its associated component and also to apply the axial load required to urge the second seal face member into sealing engagement with the first seal face member.

In operation, the bellows unit will be subjected to a pressure differential across its walls, and consequently not only must the bellows unit be capable of applying the appropriate load to the seal face members, but must also be capable of withstanding the pressure differentials to which it is subjected. Furthermore as the seal face members wear, the bellows unit must be capable of extending and provide a load within certain limits over the life of the seal.

The bellows unit must consequently be made of a material of sufficient strength and thickness to withstand the pressure differential, whilst being sufficiently flexible to permit the required axial movement due to wear, while retaining the required axial thrust.

One method of achieving this is to produce a bellows unit by welding together a plurality of annular discs, alternate pairs of discs being welded together at their inner and outer diameters to form a series of convolutions. The production of this form of bellows unit is however a lengthy and costly process. Furthermore the "hydraulic balance diameter" of the welded bellows unit varies with the pressure differential across its walls and the overall design of the bellows unit/seal face member assembly must accommodate this variation in order to provide a seal which will function satisfactorily at all the pressure differentials to which it is subjected.

A cheaper method of producing bellows units is by forming convolutions in a thin walled tube. Bellows units of this type, hereinafter referred to as formed bellows units, have the advantage that the "hydraulic balance diameter" is substantially constant and consequently the design restrictions on the bellows unit/seal face member assembly are not as great as with the welded bellows units.

Unfortunately with formed bellows units, the flexibility and yield pressure requirements conflict. As a result, it has not been possible to provide a formed bellows unit of reasonably high pressure capacity which is flexible enough to give the required face loading, without being unacceptably long.

According to one aspect of the present invention, a mechanical face seal for providing a seal between a pair of relatively rotatable machine components and which in use is subjected to a pressure differential, comprises a first seal face member which is secured in fluid-tight manner to one of said components and has a sealing face, a second seal face member having a sealing face which is urged against the sealing face of the first seal face member, the second seal face member being secured to the other of said components by means of a flexible resilient formed bellows unit (as hereinafter defined) which serves to seal the second seal face member to said other component, said bellows unit having a plurality of convolutions, the crowns of the convolutions which are directed towards the high pressure side of the seal being of greater radius of curvature than the crowns of the convolutions directed towards the low pressure side of the seal.

By adopting a formed bellows unit configuration according to the present invention, the bellows unit may be made of a thinner material than a formed bellows unit of conventional symmetrical configuration, which will withstand the same pressure differential. Consequently, for a given pressure differential, it is possible by the present invention to produce a bellows unit of greater flexibility, so that a formed bellows unit with dimensions, pressure capacity and flexibility acceptable for a mechanical face seal may consequently be formed. Conversely the bellows unit according to the present invention having a flexibility similar to that of a conventional symmetrically formed bellows, would have a greater pressure capacity.

Significant improvements in the flexibility or pressure capacity of bellows units designed in accordance with the present invention, may be achieved by using ratios of the radii of the crowns of the convolutions directed towards the high pressure side of the bellows unit to those directed towards the low pressure side of the bellows unit of 3:2 or greater. However it is preferred to use ratios from 2:1 to 6:1.

The present invention is now described by way of example only, with reference to the accompanying drawing which shows diagrammatically a cross-section of a mechanical face seal formed in accordance with the present invention.

As illustrated in the accompanying drawing, a mechanical face seal between a rotary shaft 10 and a housing 11 in, for example, a pump assembly, comprises a first annular sealing member or seat 12 which is retained in a recess in the housing 11 and is sealed thereto by means of an elastomeric 'O'-ring 13.

The sealing face 14 of an annular seal face member 15 is maintained in sealing contact with seat 12 by means of a formed metal bellows unit 16 which is secured to a collar 17 mounted upon shaft 10 by means of a series of circumferentially spaced grub screws 23, or by other suitable fastening means, and sealed thereto by 'O'-ring 18. The seal face member 15 is a press fit in the end of the bellows unit 16, an elastomeric 'O'-ring 20 retained in the outermost convolution of the bellows unit 16 and face member 15 serving to produce a fluid-tight seal therebetween. The other end of the bellows unit 19 is welded to the collar 17, but may be secured to the collar by any other means which will produce a fluid-tight joint, for example swaging or brazing.

The metal bellows unit 16 comprises a series of corrugations, the radius of the crowns 21 of the corrugation directed away from the shaft 10 being greater than the radius of the crowns 22 of the corrugations directed towards the shaft 10, by a ratio of 4:1.

The seal described above is assembled so that the bellows unit 16 is under compression and pre-loads the face member 15 towards the seat 12 so that the sealing face 14 of the face member 15 is held in sealing engagement with the seat 12.

In operation the seal is subjected to a pressure differential across its faces, a higher pressure region P existing on the outside of bellows unit 16, compared with the interior of he bellows unit.

This pressure differential creates an axial extension force proportional to the pressure differential. This axial force reinforces the initial force applied to the seal face member 15 by the axially compressed bellows unit 16. As a consequence of this additional force which is applied under operative conditions, the load applied between the seat 12 and seal face member 15, under a wide range of operating conditions, is only just in excess of that required to create an effective seal under the prevailing conditions. By this means wear on the seal face member 15 may be minimised.

This mode of operation, is not in itself new. The present invention lies in a novel configuration of the bellows unit 16, which allows greater control over the characteristics of the bellows unit. For example, in order to withstand the pressure differential to which the bellows unit is subjected, it must be made of a material of sufficient strength and gauge to withstand the pressure without collapsing. The configuration claimed herein, permits the bellows unit to be made of a lighter gauge material than would be necessary for a bellows unit of conventional symmetrical design, which will withstand the same pressure differential. The use of lighter gauge material results in the bellows unit of greater axial flexibility and consequently using a bellows unit according to this invention, the bellows unit may initially be compressed to a greater degree and thereby provide a more uniform pre-load on the face seal 15, throughout its life.

The following example illustrates the improvement in the performance of the bellows, which may be achieved by the present invention.

EXAMPLE

Three bellows units A; B and C were formed from the same material, each having an outer diameter of 66.58 mm, an inner diameter of 53.42 mm and a wall thickness of 0.18 mm. All three units were formed with plain radiused convolutions, the walls of the convolutions being substantially transverse to the axis of the bellows unit, as illustrated in the accompanying drawing.

Bellows unit A was of conventional symmetrical configuration, the radius of the inner and outer crowns of the convolutions being equal and the pitch of the convolutions being 7.21 mm. Bellows units B and C were formed in accordance with the present invention, with the radius of the outer crowns of the convolutions being twice that of the inner crowns, the pitch of the convolutions being 5.67 mm for the bellows unit B, and 7.1 mm for the bellows unit C.

When these bellows units were pre-compressed with a controlled axial displacement, to give an initial axial force of 300 Newtons:

Bellows units A and B exhibited similar pressure capacities, but bellows unit B showed a 45% improvement in flexibility over bellows unit A; and Bellows units A and C exhibited similar flexibilities, but bellows unit C showed a 31% improvement in pressure capacity over bellows unit A.

As illustrated in the above example, the bellows units used in accordance with the present invention, may exhibit: improved flexibility, in which case the bellows unit may be shortened or used to provide a seal with greater wear allowance; or improved pressure capacity; as compared to similar conventional bellows units of symmetrical configuration. Alternatively, the bellows units used in the present invention may be designed to give improvements in both the flexibility and pressure capacity, optimising these improvements in accordance with the particular requirement for the mechanical face seal.

Various modifications may be made without departing from the invention, for example where the seal is to be subjected to high pressure on the inside of the bellows unit, the radii of the crowns of the convolutions are reversed.

As explained above, the "hydraulic balance diameter" of the formed bellows according to the present invention, is substantially constant, and while the seal face member associated with the bellows unit must be designed to give a balanced seal, there is no need for the relatively complex design of retaining ring arrangements which are necessary to compensate for the variation in "hydraulic balance diameter" which are experienced with the welded bellows. The seal face member 15 may consequently be a push-fit into the end of the bellows unit 16 as described above. While in the above description an 'O'-ring is used to form a seal between the bellows unit and the seal face member, this may be dispensed with if the fit between the seal face member and bellows unit is good enough to produce a fluid-tight joint, however in order to accommodate manufacturing tolerances a layer of a suitable sealant may be applied therebetween. Alternatively the end of the bellows unit may be tapered outwardly and the outer surface of the seal face member correspondingly tapered.

With these forms of press-fit joint, it is necessary to have some means of axial location of the seal face member with respect to the bellows unit. This may be achieved by butting the seal face member up to the wall of the first corrugation of the bellows unit, as shown in the accompanying drawing. With this arrangement however, the seal face member interferes with the flexing of the first corrugation of the bellows thus reducing the overall flexibility of the bellows. It is therefore desirable to separate the seal face member from the wall of the first corrugation, and an abutment may be provided on the end portion of the bellows unit, for this purpose.

While the press-fit joints described above are particularly suitable for face members 15 made of fragile material such as carbon, alternatively the carbon seal face member 15 may be retained in a metal ring, to which the bellows unit may be connected by swaging, brazing or welding. Swaging may also be used to connect the bellows directly to the seal face member, where the seal face member is made of a hard material such as sintered metal carbide or nitride.

The term "formed bellows unit" used in this specification covers any bellows unit of monolithic construction, such bellows units are conveniently formed from a tubular metal blank, by a suitable forming process for example rolling or blowing. However the bellows unit may be made from other flexible resilient materials, for example rigid plastics such as polytetrofluoroethylenes. Such units may be made by methods similar to those used to make metal bellows units or by other suitable methods, for example, machining or where suitable direct moulding.

Furthermore the bellows unit may be of multi-ply construction and where for example, it is necessary in order to prevent corrosion of a metal bellows unit, at least one surface of the metal bellows may be covered with a non-metallic material.

In the embodiment described above, the walls of the convolutions of the bellows unit are parallel, variations in the characteristics of the bellows unit may be achieved by altering the configuration of the walls between the crowns of the convolutions, and, for example, the walls may be continuously curved between the crowns of the convolutions to form a re-entrant configuration.

We claim:

1. A mechanical face seal for providing a seal between a pair of relatively rotatable machine components, and which in use are subjected to a pressure differential, comprising a first seal face member which is secured in fluid-tight manner to one of said components and has a sealing face, a second seal face member having a sealing face which is urged against the sealing face of the first seal face member, the second seal face member being secured to the other of said components by means of a flexible resilient formed bellows unit which serves to seal the second seal face member to said other component, said bellows unit having a plurality of convolutions, the crowns of the convolutions which are directed towards the high pressure side of the seal being of greater radius of curvature than the crowns of the convolutions directed towards the low pressure side of the seal.

2. A mechanical face seal according to claim 1 in which the ratio of the radii of the crowns of the convolutions directed towards the high pressure side of the bellows unit to those directed towards the low pressure side of the bellows unit, is at least 3:2.

3. A mechanical face seal according to claim 1 in which the ratio of the radii of the crowns of the convolutions directed towards the high pressure side of the bellows unit to those directed towards the low pressure side of the unit, is from 2:1 to 6:1.

4. A mechanical face seal according to claim 1 in which the walls of the convolutions of the bellows unit are parallel, when the bellows unit is unstressed.

5. A mechanical face seal according to claim 1 in which the walls of the convolutions of the bellows unit are curved, when the bellows unit is unstressed.

6. A mechanical face seal according to claim 1 in which the bellows unit is made of metal.

7. A mechanical face seal according to claim 1 in which the bellows unit is made of a rigid plastics material.

8. A mechanical face seal according to claim 1 in which the bellows unit is of multi-ply construction.

9. A mechanical face seal according to claim 1 in which the second seal face member is a push-fit in the end of the bellows unit.

10. A mechanical face seal according to claim 9 in which an abutment is provided in the end portion of the bellows unit, said abutment being spaced from the corrugations of the bellows unit and acting to locate the second seal face member axially within the end portion of the bellows unit.

11. A mechanical face seal according to claim 1 in which the second seal face member is located in a retaining ring which is secured to the bellows unit in a fluid-tight manner.

12. A mechanical face seal according to claim 11 in which the end portion of the bellows unit is swaged, brazed or welded to the retaining ring.

13. A mechanical face seal according to claim 1 in which the second seal face member is made from a hard material and the end portion of the bellows unit is swaged directly onto the seal face member.

* * * * *